United States Patent [19]

Novak et al.

[11] Patent Number: 5,489,651

[45] Date of Patent: Feb. 6, 1996

[54] POLYMERIZATION USING BIMETALLIC BIS-LANTHANOID INITIATORS

[75] Inventors: Bruce M. Novak, Amherst, Mass.; Lisa S. Boffa, El Cerrito, Calif.

[73] Assignee: The Regents of the University of California, Oakland, Calif.

[21] Appl. No.: 194,902

[22] Filed: Feb. 14, 1994

[51] Int. Cl.$^6$ .............................. C08F 4/52; C08F 299/00
[52] U.S. Cl. .................. 525/269; 525/330.2; 525/333.7; 525/411; 525/412; 525/415; 525/416; 526/170; 526/172; 526/379.7; 528/357
[58] Field of Search ................. 525/269, 330.2, 525/333.7, 411, 412, 415, 416; 526/172, 170; 528/357

[56] References Cited

U.S. PATENT DOCUMENTS

| | | | |
|---|---|---|---|
| 5,028,667 | 7/1991 | McLain et al. | 525/415 |
| 5,208,297 | 5/1993 | Ford et al. | 525/415 |
| 5,218,064 | 8/1993 | Yasuda et al. | 526/160 |

OTHER PUBLICATIONS

Yasuda et al., *Prog. Polym. Sci.*, 18 1097–1139 (1993) "Characteristics of Rare Earth Systems as Polymerization Initiators".
Yasuda et al., *Makromol. Chem., Macromol. Symp*, 67 187–201 (1993) "Novel synthesis of high molecular weight polymers with extremely low polydispersity by the unique initiation properties of organolanthanide complexes".
Evans *J. of Alloys and Compounds*, 192 205–210 (1993) "Achieving new lanthanide chemistry within the tetracyclopentadienyl cavity formed by two $(C_5Me_5)_2Ln$ moieties".
Evans et al., *J. Am. Chem. Soc.*, 110 4983–4994 (1988) "Synthetic, structural, and reactivity studies of the reduction and CO derivatization of azobenzene mediated by divalent lanthanide complexes".
Evans et al., *J. Chem. Soc. Chem. Commun.* 837–838 (1987) "Synthesis and X–ray crystal structure of $[(C_5Me_5)_2Sm]_2C_4Ph_2$, a samarium $\eta^2$–complex derived from an alkyne".
Evans et al., *J. Am. Chem. Soc.*, 112(6) 2314–2324 (1990) "Reactivity of $(C_5Me_5)_2Sm$ and related species with alkenes: Synthesis and structural characterization of a series of organosamarium allyl complexes".
Yasuda et al., *Macromolecules*, 26 7134–7143 (1993) "Synthesis of High Molecular weight poly(methyl methacrylate) with extremely low polydispersity by the unique function of organolanthanide (III) complexes".
H. Yasuda et al. (1992) Macromol. 25, 5115–5116.
H. Yasuda et al. (1992) J. Am. Chem. Soc. 114, 4908–4910.

*Primary Examiner*—Mark Nagumo
*Attorney, Agent, or Firm*—Flehr, Hohbach, Test, Albritton & Herbert

[57] ABSTRACT

"Living" polymerization methods are described wherein a bimetallic lanthanide complex initiator is reacted with a monomer. Using these methods, link-functionalized polymers can be formed that are capable of being modified after polymerization with various reactants, or to be biodegraded through oxidation or reduction or cleavage. The bimetallic lanthanide complex initiator can be used to polymerize methyl methacrylate in a living fashion. A two-step method of forming a triblock polymer using the bimetallic lanthanide complex initiator is also disclosed.

15 Claims, 3 Drawing Sheets

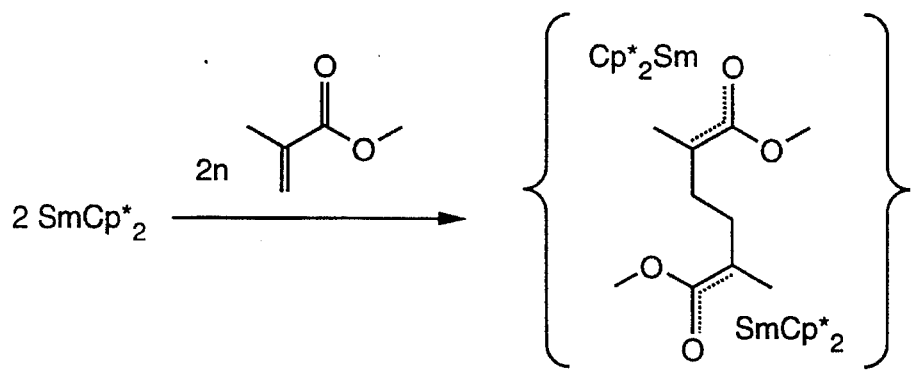
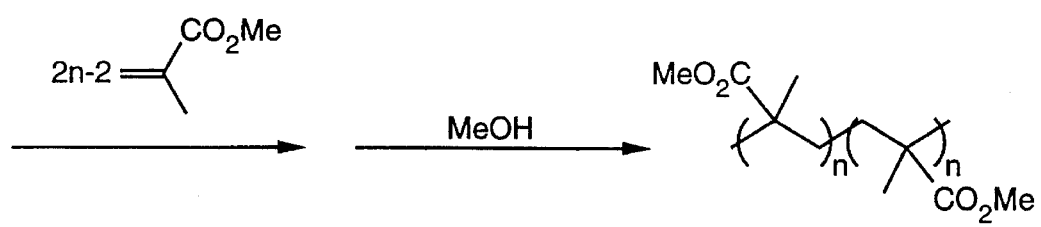
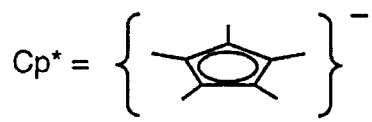
FIG._1
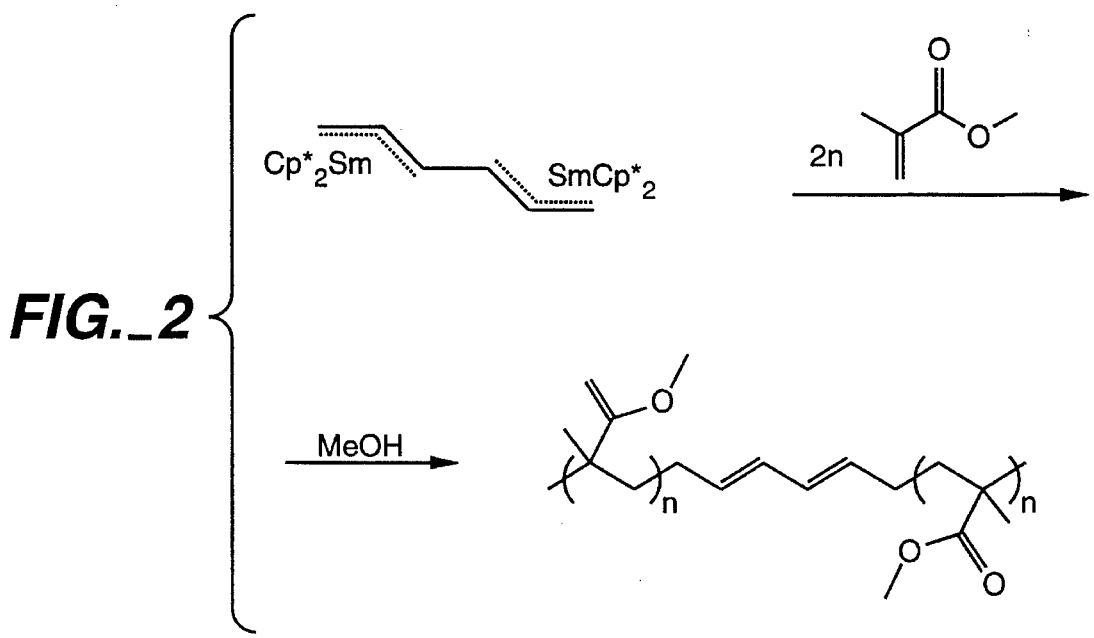
FIG._2

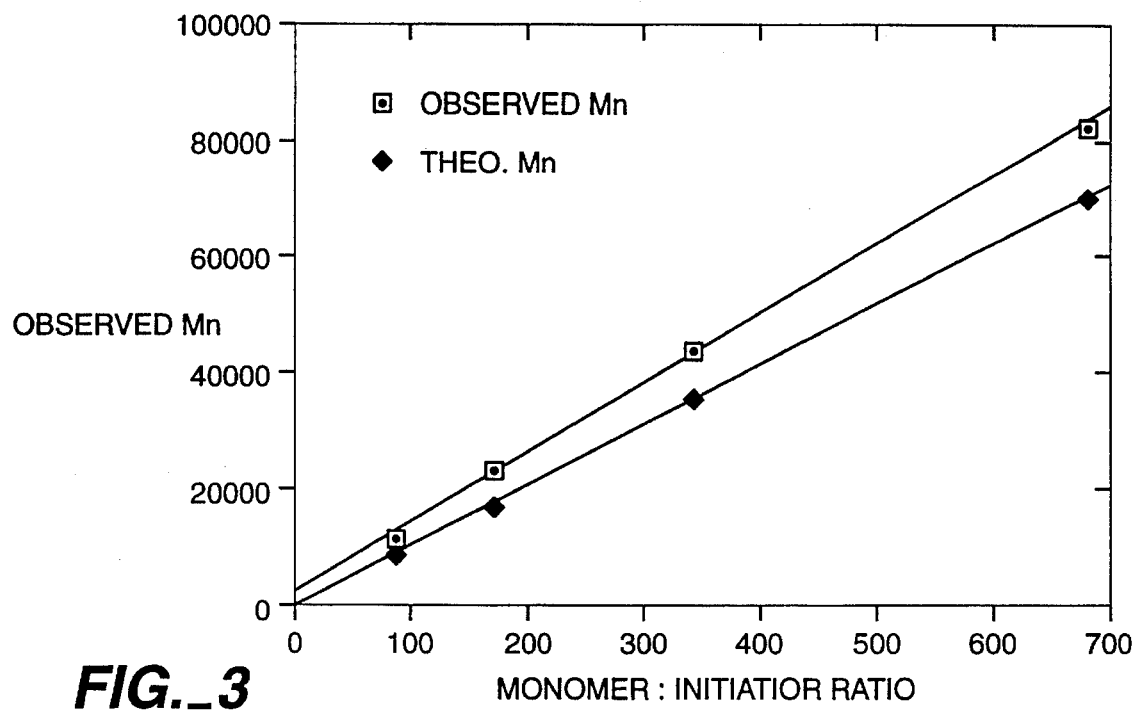
FIG._3
FIG._4

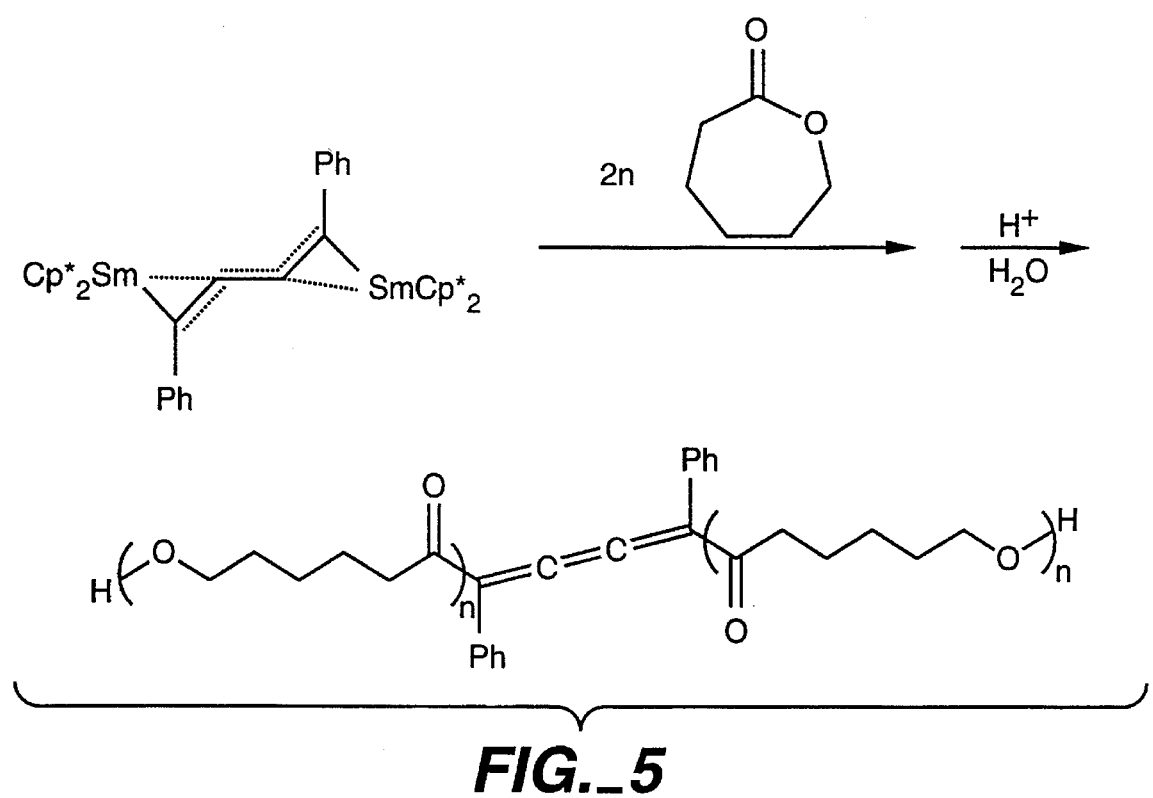
FIG._5

POLYMERIZATION USING BIMETALLIC BIS-LANTHANOID INITIATORS

This invention was made with Government support under Grant (Contract) No. DMR-9157026 awarded by the National Science Foundation. The Government has certain rights to this invention.

BACKGROUND OF THE INVENTION

Bisfunctional polymers (polymers with functionality at both ends of the polymer chain) are highly valuable materials. If the functionalities are simple functional groups, i.e. acids, alcohols, etc., then these polymers can serve as "macromers", high molecular weight building blocks. If the functionality is present as polymer chains with a different repeat unit, then triblock copolymers are formed. Triblock polymers have physical properties unique to their class of materials. Those consisting of polar/nonpolar components have special adhesion and dyeing capabilities. Triblocks with crystalline/elastic components behave as thermoplastic elastomers, which are rubbery (hence elastomers) yet have only physical crosslinks, allowing them to be melt-processed (hence thermoplastic). This behavior is in contrast to that of most rubber materials in use, which have chemical crosslinks (thermosets), meaning they cannot be flow processed and are not recyclable. Triblock copolymers consisting of poly(methyl methacrylate) (PMMA) and an elastic segment such as a poly(alkyl acrylate) are desirable for such reasons.

It has recently been demonstrated that samarium complexes of the type $Cp*_2SmR$ (R=hydride, alkyl; $Cp*= C_5Me_5$) function as catalysts for the "living" polymerization of methyl methacrylate [Yasuda et al., *J. Am. Chem. Soc.* 114:4908–4911 (1992)]. Well-controlled polymerizations of acrylates, lactones, and ethylene by these and related lanthanide compounds have also been achieved, leading to the production of block copolymers containing both a polar and nonpolar polymer unit [H. Yasuda et al., *Macromolecules* 25:5115–5116 (1992)]. The samarium (II) compound $Cp*_2Sm\bullet THF_2$ ($Cp*=C_5Me_5$) has also been shown to exhibit similar behavior, supposedly through a trivalent hydride intermediate; however, relevant literature also documents low (below 50%) initiator efficiency and inflated molecular weights [H. Yasuda et al., *Macromol. Chem., Macromol. Symp.* 67:187–201 (1993)].

Another recent development in the chemistry of samarium has been the synthesis of a class of Sm(III) complexes formed via bimetallic, two-electron reductions of unsaturated substrates by $Cp*_2Sm$ and its solvates [see W. J. Evans, *J. of Alloys and Compounds* 192:205–210 (1993)].

Efforts are continually being made to develop better methods of utilizing new catalysts for polymerizations of and for the production of polymers and triblock copolymers having unique physical properties.

None of the foregoing references is believed to disclose the present invention as claimed and is not presumed to be prior art. The references are offered for the purpose of background information. The contents of these references are hereby incorporated by reference.

SUMMARY OF THE INVENTION

It is an object of the present invention to provide "living" polymerization methods for the formation of a variety of link-functionalized polymers that are capable of being modified after polymerization with various reactants, or to be biodegraded through oxidation or reduction or cleavage.

It is also an object of the present invention to provide a two-step method for the formation of triblock copolymers.

These objects are accomplished by the methods disclosed herein of polymerizing acrylates comprising reacting a bimetallic lanthanide complex initiator with a polymerizable monomer. The bimetallic lanthanide complex initiator has the general formula M-L-M, wherein M is an organic lanthanide complex comprising a metal of the lanthanide series, and L is a functionalized linking group that is covalently bound to each of the two metal atoms. The resulting polymer has the formula $(A)_n(L)(A)_m$, wherein A is the monomer and n and m are integers of at least one and are the number of repeating units.

A two-step method of forming a triblock polymer is also disclosed wherein the bimetallic lanthanide complex initiator is reacted with a first monomer to form a first polymer having the formula $M(A)_n(L)(A)_mM$. The first polymer is then reacted with a second monomer to form a triblock polymer having the formula $(Z)_o(A)_n(L)(A)_m(Z)_p$, wherein Z is the second monomer and o and p are the number of repeating units.

BRIEF DESCRIPTION OF THE FIGURES

FIG. 1 depicts the previously unknown bimetallic mechanism of the polymerization of methyl methacrylate by $SmCp*_2$.

FIG. 2 depicts the polymerization of methyl methacrylate by $[Cp*_2Sm(\mu-\eta^3-CH_2CHCH-)]_2$.

FIG. 3 shows the variation in molecular weight as a function of monomer:initiator ratio for the bis-initiator $Cp*_2Sm(\mu-\eta^3-CH_2CHCH-)_2$ for polymerizations carried out in tetrahydrofuran (THF) at 0° C.

FIG. 4 shows the production of a triblock copolymer using $Cp*_2Sm(\mu-\eta^3-CH_2CHCH-)_2$ as an initiator.

FIG. 5 shows the polymerization of ε-caprolactone by $Cp*_2Sm(PhC_4Ph)SmCp*_2$.

DETAILED DESCRIPTION OF THE INVENTION

Disclosed herein is the use of bimetallic lanthanide complexes containing functional linking groups as catalysts for the living polymerization of a variety of monomers to form "link-functionalized" polymers of several types, and the use of these catalysts for the synthesis of triblock polymers. Only bimetallic catalysts can be used to produce link-functionalized polymers, as only end functionalization can be achieved with monometallic, monoinitiating species.

The catalysts have the general formula M-L-M, wherein M is an organic lanthanide complex comprising a metal of the lanthanide series, and L is a functionalized linking group. The catalysts disclosed herein are exemplified using bis-samarium complexes. However, it is predicted that any metal of the lanthanide series will function equivalently. The linking group is covalently bound to each of the lanthanide metals, usually by way of lanthanide/carbon, lanthanide/nitrogen, or lanthanide/enolate bonds.

The term "functionalized linking group" as used herein means that the linking group contains any useful functionality which is maintained after polymerization. The term also encompasses linking groups that, although are not reactive after polymerization, have structures that differ from the monomers being polymerized so that the resulting polymer will have a unique linking component that is distinguishable from the rest of the polymer. It is expected that all nucleophilic linkers will be active linking groups. The size and structures of the functionalized linking group may vary greatly. However, the structure of the linking group should be such so as not to interfere with the polymerization process. For example, a functional group comprising a lone pair of electrons adjacent to one of the lanthanide metals may provide an environment that is too electron-rich for the metal, thus tending to inhibit polymerization. Also, a functional group may comprise a relatively large and bulky component that is adjacent to the metal which may sterically hinder polymerization.

Typically, the functionalized linking group will have the general formula —CRC—, —NRN—, or —ORO—, wherein C is a carbon atom, N is a nitrogen atom, O is an oxygen atom, and R is a linear or cyclic, saturated or unsaturated or otherwise functionalized carbon or silicon containing group. In some embodiments, rather than having a —CRC— or —NRN— configuration, the functionality will reside on one or both of the atoms attached to the metal, and the atoms attached to the metal will be directly bound to each other. An example of this type of linking group is one with the formula $\mu—\eta^1:\eta^1$—PhNNPh.

Typically the organic lanthanide complex will comprise a lanthanide metal bound to auxiliary ligands. Such ligands are molecular groups that provide sufficient electronic (Lewis acidity) and size requirements for the monomer to coordinate with the metal atom. Relatively larger and/or more electron rich auxiliary ligands tend to slow down or inhibit polymerization, while smaller and less electron rich auxiliary ligands speed up polymerization. Suitable auxiliary ligands are well known by polymer chemists and include cyclopentadienyl, and substituted cyclopentadienyls. The synthesis of catalysts having these auxiliary ligands is well known in the art.

The bimetallic lanthanide catalysts are capable of polymerizing a variety of monomers that have ring structures or polymerizable double bonds. Suitable monomers are functionalized monomers. By the term "functionalized monomer", it is meant one in which the functionality is not lost upon polymerization. The term "functionalized monomer" is different from, and not to be confused with, the term "functionalized linking group". The functional groups on the monomers can include, but are not limited to, carboxyl, carbonyl, halide, cyanide, ether, phenyl, amides and amines. Functional monomers that are polymerizable using bimetallic bis-lanthanoid initiators include acrylates and lactones, isocyanates, lactams, and α-olefins. As used herein, the term "acrylates" includes methacrylates and all other $\alpha_1$, $\beta$ unsaturated esters, and acrylates with substituents on the carbon atom to the carbonyl group. Historically, polar-functionalized monomers such as α acrylates were difficult to polymerize because the polar groups tend to deactivate the catalysts.

In some embodiments, after polymerization, the resulting link-functionalized polymer can be further reacted with reducing, oxidizing, cleaving, or cross-linking agents. For example, the linker might be readily oxidized or reduced so that the resulting polymer could be biodegradable.

These bimetallic catalysts can be used to conveniently form triblock copolymers. Monoinitiators frequently cannot be used to produce triblocks in cases where one monomer is more strongly coordinating than the monomer to be added in the next step. Bimetallic catalysts can circumvent this constraint entirely since both "ends" of the triblock polymer produced are attached at once. Even for triblock copolymers that can be made by monometallic catalysts, bisinitiators offer a synthetic advantage because the two-ended structure of the growing polymer chain will allow triblocks to be produced in two steps rather than the three steps necessary for monometallic catalysts. For example, the polymerization of monomer A utilizing a bimetallic catalyst having the general formula M-L-M, results in a polymer having the general formula $M(A)_n(L)(A)_mM$. With the subsequent addition of monomer Z, a triblock copolymer forms having the general structure: $M(Z)_o(A)_n(L)(A)_m(Z)_pM$. After polymerization, the catalyst, which is sensitive to air and water is removed from the polymer to result in a triblock copolymer having the formula $(Z)_o(A)_n(L)(A)_m(Z)_p$. A reaction scheme for the two-step process of forming a triblock polymer using a bimetallic catalyst is shown in FIG. 4. The monomers that form the triblock can be selected so as to result in polymers having desirable properties. For example triblocks can be formed with polar and nonpolar monomers such as methacrylates and ethylenes respectively. Triblocks can also be formed with crystalline and elastic monomers to result in strong yet elastic materials.

The compounds $Cp*_2Sm\bullet THF_2$ and $Cp*_2Sm$ have been investigated as bis-initiating catalysts for the polymerization of methacrylates and for the production of "link-functionalized", telechelic, and triblock polymers. Evidence supports that these polymerizations proceed through a mechanism involving reductive coupling of methyl methacrylate instead of a monometallic hydride (FIG. 1). The bimetallic samarium catalyst produced in the polymerization does not have the low initiator efficiency previously believed (Yasuda, supra), but rather produces a polymer twice as large than expected from a monometallic species.

This information led to the examination of bisinitiating samarium (III) complexes as methyl methacrylate polymerization catalysts. Recently a class of Sin(III) compounds has been synthesized via bimetallic, two-electron reductions of unsaturated substrates by Cp*Sm and its solvates (W. J. Evans, supra). The present invention shows that the use of these complexes as polymerization catalysts results in "link-functionalized" polymers, due to the nature of their bridging initiating groups.

The bis-allyl complex $[Cp*_2Sm(\mu—\eta^3—CH_2CHCH—)_2$ (Evans et al., supra), hereinafter referred to as "catalyst (1)", was found to catalyze the polymerization of methyl methacrylate at moderate temperatures in a well-controlled fashion. (FIG. 2). The polymerization proceeds quickly in both THF and toluene at 0° C., with quantitative yields of PMMA produced in less than two hours. This system also exhibits excellent molecular weight control; a plot of observed $M_n$ versus monomer to initiator (M:I) ratio (FIG. 3) shows excellent linearity. The molecular weights obtained approach the theoretical values calculated assuming that both samarium centers in the catalyst are active. In no case was any polymer with $M_n=\frac{1}{2}$(observed $M_n$) produced, indicating that monoinitiation by only one samarium center does not occur. This is the first example of the use of a bimetallic lanthanide complex to polymerize methyl methacrylate in a living fashion.

The polydispersities of the PMMA obtained with catalyst (1) are approximately 1.1. If care is not taken to remove all traces of $Cp*_2Sm$ precursor during catalyst synthesis, the production of a small amount of polymer at a slightly lower molecular weight by the samarocene causes polydispersities to increase. The bis(THF) solvate of $Cp*_2Sm$ has previously been shown to be an active methyl methacrylate polymerization catalyst (H. Yasuda, supra).

Because the allyl initiating groups of both samarium centers in catalyst (1) are linked together, the poly(methyl methacrylate) produced has the structure shown in FIG. 2. Other bimetallic Sm(III) complexes that can be used as catalysts in the polymerization methods disclosed herein for the synthesis of polymers containing functionalized links, include [Cp*$_2$Sm]2($\mu$—$\eta^1$:$\eta^1$—PhNNPh) [W. J. Evans et al., *J. Am. Chem. Soc.* 110:4983–4994 (1988); incorporated herein by reference], and Cp*$_2$Sm(PhC$_4$Ph)SmCp*$_2$ (W. J. Evans, supra), hereinafter referred to as "catalyst (2)". These links may lend special properties to the polymers produced, or be chemically altered after incorporation into the polymer backbone. The reaction scheme of the polymerization of $\epsilon$-caprolactone utilizing catalyst (2) is shown in FIG. 5.

In order that the invention described herein may be more fully understood, the following example is set forth. It should be understood that the example is for illustrative purposes only and is not to be construed as limiting the scope of the invention in any manner.

EXAMPLE

Catalyst (1) and precursors were synthesized according to literature methods (Evans et al., supra). Tetrahydrofuran (THF) was distilled from Na/benzophenone before use. Methyl methacrylate was dried over CaH$_2$, vacuum-transferred, and stored under an argon atmosphere at –40° C. All organometallic compounds were handled utilizing Schlenk techniques or in an ether-free glove box under argon. Polymerizations were carried out in THF at 0° C. under argon using Schlenk techniques. Reactions were quenched by the addition of a large excess of methanol. After isolation by filtration, the white poly(methyl methacrylate) (PMMA) was purified by reprecipitation from chloroform/methanol.

Molecular weights and polydispersity indices (PDIs) were determined by gel permeation chromatography on a Hewlett-Packard 1050 series liquid chromatography pump equipped with a model 1047 refractive index detector and a model 3396a integrator. Separations were effected by 10$^5$ Å, 10$^4$ Å, 10$^3$ Å, and 500 Å Waters Ultrastyragel columns and molecular weights were calibrated relative to polystyrene standards (Scientific Polymer Product, Inc.). The results of the polymerizations are shown in FIG. 3.

What is claimed is:

1. A method of forming a link-functionalized polymer comprising reacting a bimetallic lanthanide complex initiator with a monomer selected from the group consisting of polar functionalized monomers having a polymerizable double bond, and lactones, said bimetallic lanthanide complex initiator having the general formula M-L-M wherein M is an organic lanthanide complex comprising a metal atom of the lanthanide series and at least one auxiliary ligand, and L is a functionalized linking group covalently bound to each of said metal atoms, said polymer having the formula (A)$_n$(L)(A)$_m$, wherein A is said monomer in polymerized form, n and m are integers of at least one and are the number of repeating units, and L has a structure that is different from A or repeating units of A.

2. The method of claim 1 wherein said metal is samarium.

3. The method of claim 1 wherein said auxiliary ligand is cyclopentadienyl or a substituted cyclopentadienyl.

4. The method of claim 1 wherein said functional linking group is selected from the group consisting of ($\mu$—$\eta^3$—CH$_2$CHCH—)$_2$, PhC$_4$Ph, and $\mu$—$\eta^1$:$\eta^1$—PhNNPh.

5. The method of claim 1 wherein said monomer is an acrylate.

6. A method of forming a triblock polymer comprising:

(1) reacting a bimetallic lanthanide complex initiator with a first monomer to form a first polymer, wherein said first monomer is selected from the group consisting of monomers having a polymerizable double bond, and lactones; and said bimetallic lanthanide complex initiator has the formula M-L-M, wherein M is an organic lanthanide complex comprising a metal of the lanthanide series and at least one auxiliary ligand, and L is a functionalized linking group covalently bound to each of said metal; said first polymer having the formula M(A)$_n$(L)(A)$_m$M, wherein A is said first monomer in polymerized form and n and m are integers of at least one and are the number of repeating units, and (2) reacting said first polymer with a second monomer to form said triblock polymer, wherein said second monomer is selected from the group consisting of monomers having a polymerizable double bond, and lactones; said triblock polymer having the formula (Z)$_o$(A)$_n$(L)(A)$_m$(Z)$_p$, wherein Z is said second monomer in polymerized form, and o and p are integers of at least one and are the number of repeating units.

7. The method of claim 6 wherein said metal is samarium.

8. The method of claim 6 wherein said auxiliary ligand is cyclopentadienyl or a substituted cyclopentadienyl.

9. The method of claim 6 wherein said functional linking group is selected from the group consisting of ($\mu$—$\eta^3$—CH$_2$CHCH—)$_2$, PhC$_4$Ph, and $\mu$—$\eta^1$:$\eta^1$—PhNNPh.

10. The method of claim 6 wherein said first monomer is a polar functionalized monomer and second monomer is a nonpolar monomer.

11. The method of claim 6 wherein said first monomer is a nonpolar monomer and second monomer is a polar functionalized monomer.

12. The method of claim 6 wherein said first monomer is methyl methacrylate.

13. The method of claim 12 wherein said second monomer is selected from the group consisting of lactones, and alkyl acrylates other than methyl methacrylate.

14. The method of claim 6 wherein said first monomer is selected from the group consisting of lactones, ethylene, and alkyl acrylates other than methyl methacrylate and said second monomer is methyl methacrylate.

15. The method of claim 6 wherein L has a structure that is different from A or repeating units of A.

* * * * *